Oct. 8, 1929.  K. E. LYMAN  1,730,668

BRAKE CONTROL

Filed Aug. 15, 1927

INVENTOR
KENNETH E. LYMAN
BY
*J. W. McConkey*
ATTORNEY

Patented Oct. 8, 1929

1,730,668

UNITED STATES PATENT OFFICE

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS

BRAKE CONTROL

Application filed August 15, 1927. Serial No. 212,978.

This invention relates to brakes and is illustrated as embodied in a control or operating device for a front wheel automobile brake.

An important object of the invention is to provide a control, of the type having a universal joint substantially in the swivelling axis of the wheel, with adjusting means (preferably operated automatically) for correcting the position of the brake-applying device as the brake wears, to preserve the original relative positions of the axes of the universal joint with respect to the swivelling axis of the wheel. Preferably the adjustment acts on an applying device which swivels with the wheel and which is operated by the universal joint. The illustrated form of adjusting means includes an automatically-shifted part arranged in the angle between an arm carried by the applying device and an arm carried by a shaft which operates the applying device.

The illustrated form of adjusting means, including the device shifted between the two arms and a radially-arranged worm between the arms for shifting the adjusting device, embodies substantial novelty in itself independently of its use with the particular type of control illustrated.

The above and other objects and features of the invention, including various novel combinations of parts and desirable particular constructions, will be apparent from the description of one illustrative embodiment shown in the accompanying drawing, in which.

Figure 1:
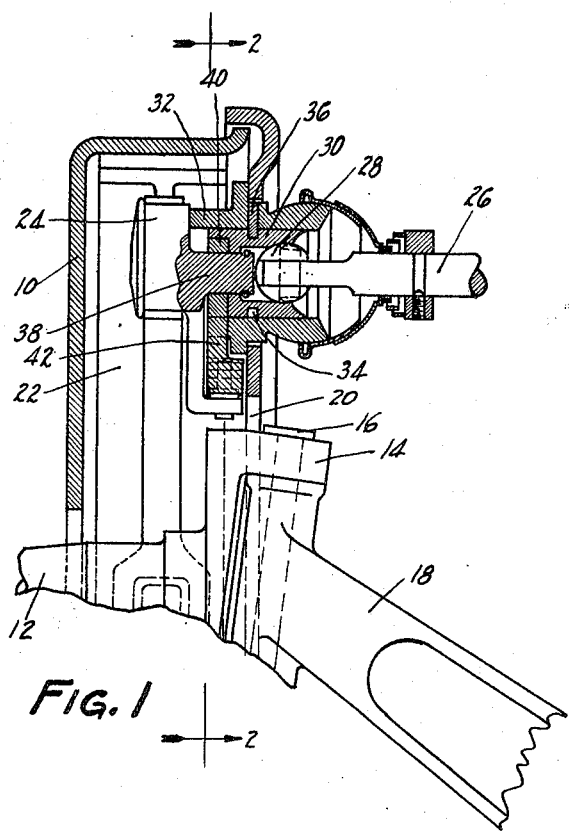
Figure 1 is a vertical section through one front brake and through associated parts, showing the control partly in rear elevation and partly in vertical section.

The illustrated brake includes a rotatable drum 10 mounted with a wheel (not shown) on a spindle 12 of a knuckle 14 which is swivelled, by means of a king-pin 16 or the like, to the end of the front axle 18. A backing plate 20 arranged at the open side of the drum 10 is secured in any desired manner to the knuckle 14 so that it swivels with the wheel. The friction means of the brake is illustrated as including shoes 22 operated by means such as a double cam 24, while the cam 24 or its equivalent is intended to be operated by a control of the well-known Perrot type including an operating shaft 26 universally mounted at its inner end on the chassis frame (not shown) and which applies the brake through a universal joint 28 of the type more fully described in Dodge Patent No. 1,604,394, granted Bendix Brake Company on October 26, 1925, on an application of A. Y. Dodge.

The operating mechanism illustrated includes a hollow shaft 30 journalled in a bracket 32 secured to the backing plate 20, the shaft 30 being grooved at 34 to receive a key 36 which extends into a slot in the bracket 32, thus preventing axial movement of the shaft 30. The hollow shaft 30 is formed with an opening at its end which serves as a bearing for a shaft 38 formed integrally of the cam 24.

A disk 40 secured in any desired manner at the end of the hollow shaft 30 is formed with a projecting arm 42 arranged to operate, through a novel thrust member 44, an arm 46 integrally extended from the shaft 38 and cam 24. The thrust member 44 is arranged in the angle between the arms 42 and 46 and is gradually shifted toward the apex of that angle,—that is, toward the axis of the shafts 30 and 38,—by means such as a worm 48 on which it is threaded and which is supported at its opposite ends by lugs 50 extending from the arm 46.

Figure 3:
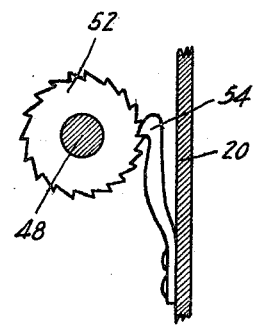
Figure 3 is a partial section through the adjustment on the line 3—3 of Figure 2.
Figure 2:
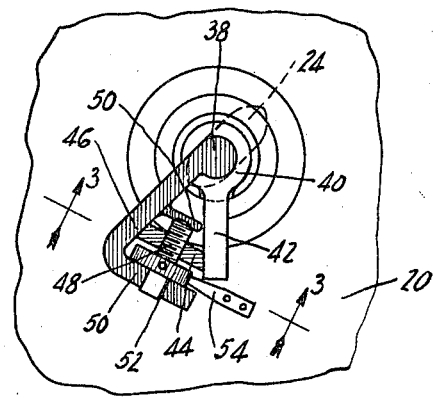
Figure 2 is a partial section on the line 2—2 of Figure 1 and showing the details of the automatic adjustment.

The worm 48 is provided with a ratchet wheel 52, integral with or secured to the worm, and which, as shown in Figure 3, is arranged to be shifted from time to time by a spring pawl 54 secured to the backing plate 20.

In operation, the brake is applied from shaft 26 acting through the joint 28 by the action of the arm 42 through the thrust member 44 on the arm 46 which operates the cam 24. As the brake wears, the cam 24 is turned more and more in applying the brake, until finally the spring pawl 54 will snap over the next tooth of the ratchet 52, whereupon, when the brake is released, the worm 48 will be shifted by the turning of the ratchet to force the thrust member 44 a few thousandths of an inch toward the axis of the shafts 30 and 38, thus turning the cam 24 slightly to compensate for wear of the brake.

While one illustrative embodiment of the invention has been described in detail, it is not my intention to limit the scope of the invention to that particular embodiment or otherwise than by the terms of the appended claims.

I claim:

1. Operating mechanism for a brake on a swivelled wheel, comprising, in combination, a universal joint substantially at the swivelling axis of the wheel, applying means operated through said joint, and means automatically operated as the brake wears to adjust the applying means to preserve the original relation of the axes of said joint to the swivelling axis of the wheel.

2. Operating mechanism for a brake on a swivelled wheel, comprising, in combination, a universal joint substantially at the swivelling axis of the wheel, brake-applying means operated through said joint, and means automatically adjusted as the brake wears to preserve the original relation of the axes of said joint to the swivelling axis of the wheel.

3. Operating mechanism for a brake on a swivelled wheel, comprising, in combination, a pair of shafts arranged end to end and one of which swivels with the wheel and the other of which does not swivel with the wheel, a universal joint connecting said shafts and arranged substantially at the swivelling axis of the wheel, an applying device swivelling with the wheel, and an operative connection between the applying device and the first of said shafts which is automatically adjusted, as the brake wears, to preserve the original relation between the axes of said joint and the swivelling axis of the wheel.

4. Brake-operating mechanism comprising, in combination, a shaft having an arm, an applying device carried by the shaft and having an arm opposite and at an angle to the arm of the shaft and a thrust device between said arms and which is adjustable toward the apex of the angle between the arms, to wedge the arms apart.

5. Brake-operating mechanism comprising, in combination, a shaft having an arm, an applying device carried by the shaft and having an arm opposite and at an angle to the arm of the shaft and a thrust device between said arms, and which is adjustable toward the apex of the angle between the arms, to wedge the arms apart, together with a worm arranged radially of the shaft between said arms and operable to adjust the thrust device.

6. Brake operating mechanism comprising, in combination, a shaft having an arm, an applying device on the shaft having an arm arranged opposite to and at an angle to the arm on the shaft, a thrust device wedged between said two arms, and means automatically operable to adjustably move said thrust device between said arms and toward the shaft.

7. Brake mechanism comprising, in combination, a shaft having an arm, an applying device on the shaft having an arm arranged opposite to and at an angle to the arm of the shaft, a thrust device wedged between said two arms, a worm rotatably supported between said two arms and extending threadedly through said thrust device, and a part operably engaging said worm to rotate the worm to actuate the thrust device inwardly toward the shaft wedging said arms apart.

8. Brake operating mechanism comprising, in combination, a shaft provided with a pair of oppositely disposed relatively angularly arranged arms, one arm being fixed to the shaft and the other arm being rotatable upon the shaft, a thrust member supported as a wedge between said arms, a screw to advance the same thereover upon rotation of the screw to wedge said arms apart and means automatically operable upon a determined rotation of the shaft in a given direction to rotate said screw.

In testimony whereof, I have hereunto signed my name.

KENNETH E. LYMAN.